United States Patent [19]

Perego

[11] Patent Number: 5,173,591

[45] Date of Patent: Dec. 22, 1992

[54] ELECTRIC GEARSHIFT FOR CHILDREN'S CARS

[75] Inventor: Gianluca Perego, Arcore, Italy

[73] Assignee: Peg Perego Pines S.p.A., Milan, Italy

[21] Appl. No.: 696,350

[22] Filed: May 6, 1991

[30] Foreign Application Priority Data

Jun. 29, 1990 [IT] Italy .................. 21423/90[U]

[51] Int. Cl.⁵ .................. H01H 9/00; H02P 1/08
[52] U.S. Cl. .................. 200/61.88; 200/1 V; 318/139; 318/280
[58] Field of Search .................. 200/1 V, 61.85–61.91; 318/109, 139, 280

[56] References Cited

U.S. PATENT DOCUMENTS

| | | | |
|---|---|---|---|
| 4,360,718 | 11/1982 | Schobinger et al. | 200/61.88 |
| 4,401,866 | 8/1983 | Kaminski et al. | 200/61.88 |
| 4,429,196 | 1/1984 | Beig et al. | 200/61.88 X |
| 4,639,646 | 1/1987 | Harris et al. | 318/139 |
| 4,736,648 | 4/1988 | Perego | 318/109 |

*Primary Examiner*—J. R. Scott
*Attorney, Agent, or Firm*—McGlew and Tuttle

[57] ABSTRACT

An electric gearshift device (10) for an electric car for children has a lever (12) which can be operated manually to give different electrical connections between an electric motor and sets of batteries, so as to achieve different running conditions. In particular, the device (10) comprises a first two-speed electric selector switch (16) and a second electric reversing switch (15). The lever (12) is movable from a first to a second position to control the movement of the first switch (16), in the second position acting on the first switch (16) with elastically yieldable thrust surfaces (24) to enable the lever (12) to pass said second control position and reach a third position in which it actuates the second switch (15).

19 Claims, 3 Drawing Sheets

5,173,591

ELECTRIC GEARSHIFT FOR CHILDREN'S CARS

FIELD OF THE INVENTION

This invention refers to a gearshift suitable for electric cars for children.

BACKGROUND OF THE INVENTION

In the manufacture of such cars it is advantageous to provide an electric gearshift device by which it is possible to obtain two forward "speeds" and one reverse.

SUMMARY AND OBJECTS OF THE INVENTION

The general scope of this invention is to provide a gearshift which has the aforesaid features and is simple and economical to manufacture.

This scope is achieved, according to the invention, by providing an electric gearshift device 10 for an electric car for children, of the type which can be operated manually to provide different electrical connections between an electric motor and sets of batteries. These different electrical connections correspond to different running conditions, and are implemented by a first two-speed electric selector switch 16, a second electric reversing switch 15 and a lever 12 which is movable from a first to a second position to control the movement of the first switch 16. In the second position the lever 12 acts on the first switch 16 with elastically yieldable thrust surfaces 24 to enable the lever 12 to pass the second position in which it controls the first switch 16 and reach a third position in which it actuates the second switch 15.

The innovatory principles of this invention and its advantages with respect to the known technique will be more clearly evident from the following description of a possible exemplificative and non-restrictive embodiment applying such principles.

DETAILED DESCRIPTION OF THE PREFERRED EMBODIMENT

Figure 1:
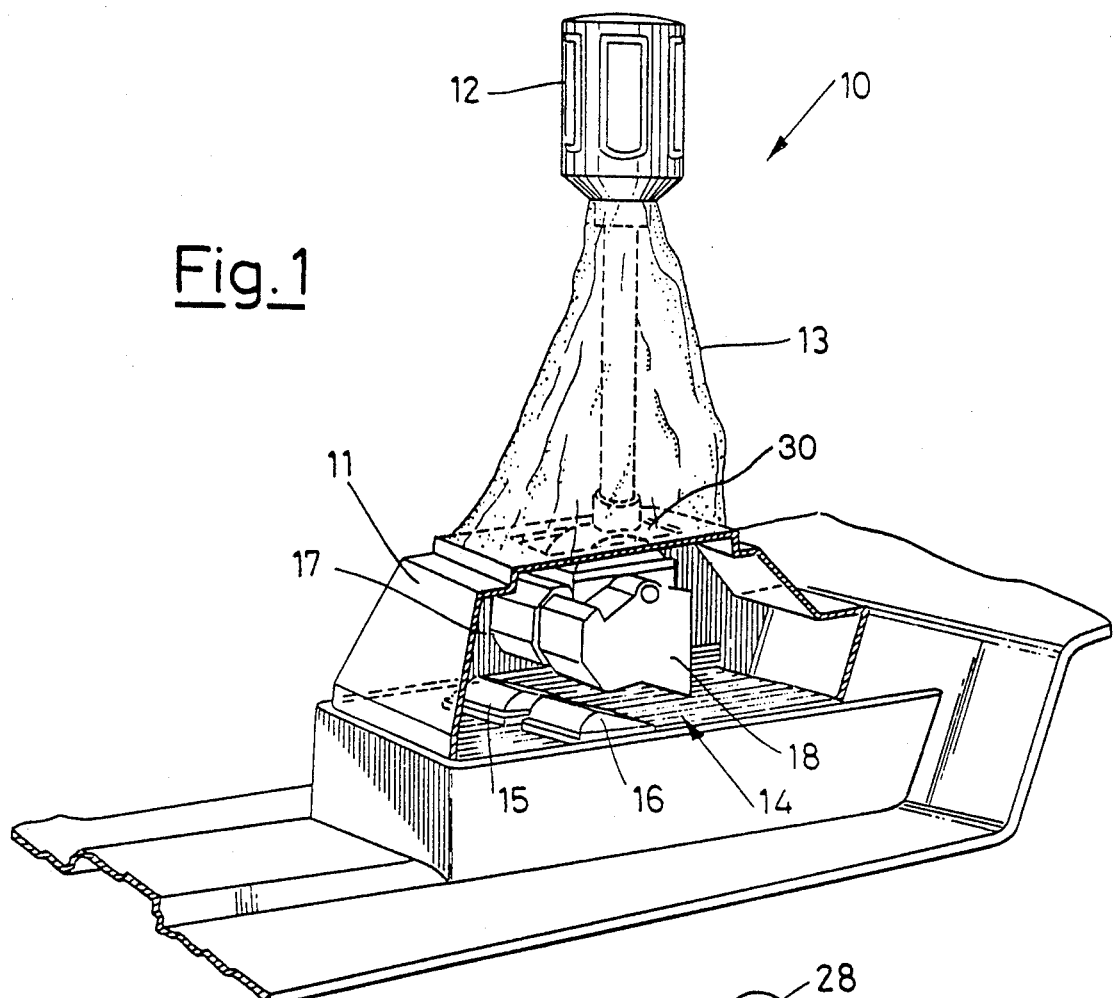
FIG. 1 shows a schematic perspective partial phantom view of an electric gearshift made according to this invention.

With reference to the Figures, a gearshift, made according to the invention and generally indicated by reference 10, comprises a box-shaped casing 11, secured to the electric car. From the top of the casing 11, protrudes a control lever 12, covered, if necessary, with a flexible sheath 13 (for example, made of rubber).

The lever 12 is connected from below to an actuating element 14 which controls electric switches 15 and 16. As can be more clearly seen in FIGS. 2 and 3, the actuating element 14 comprises a first or fixed portion 17, integral with the lever 12 and pivoted to the walls of the box 11 by means of a pivot or shaft 19 on which is rotatingly disposed a second or yield portion 18.

Disposed between the two portions 17 and 18 is a thrust spring 20. The portion 18 has a corner 21 at the end opposite that of the pivot or shaft which strikes against a protrusion 22 on the portion 17.

Figure 2:
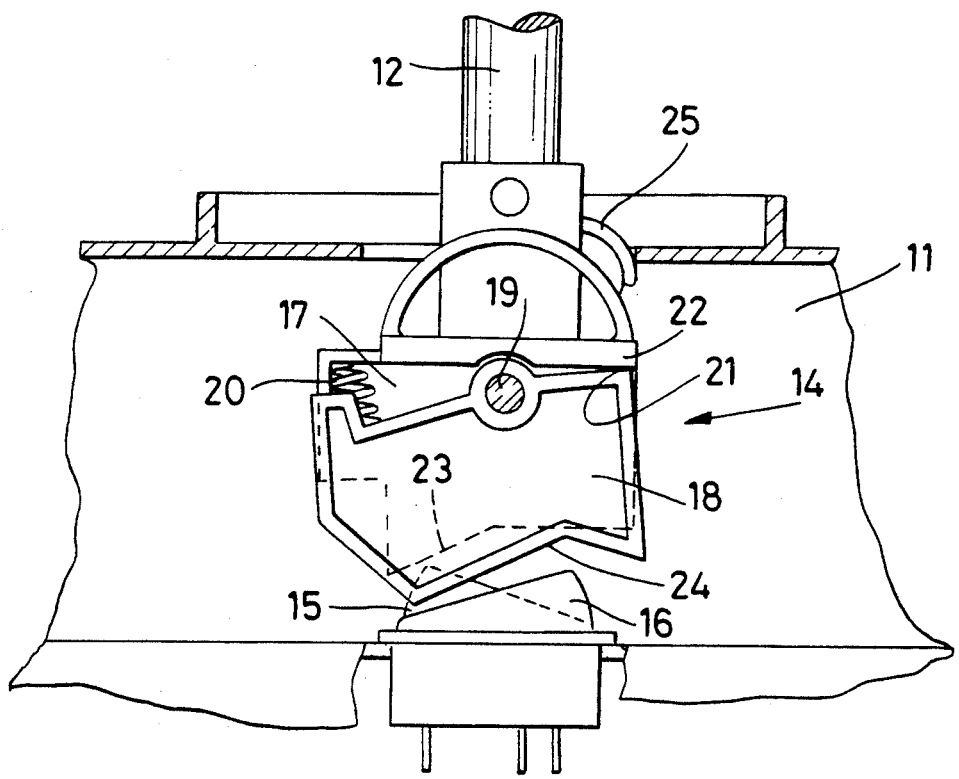
FIG. 2 shows a partial cross-sectional view of the gearshift of FIG. 1.
Figure 3:
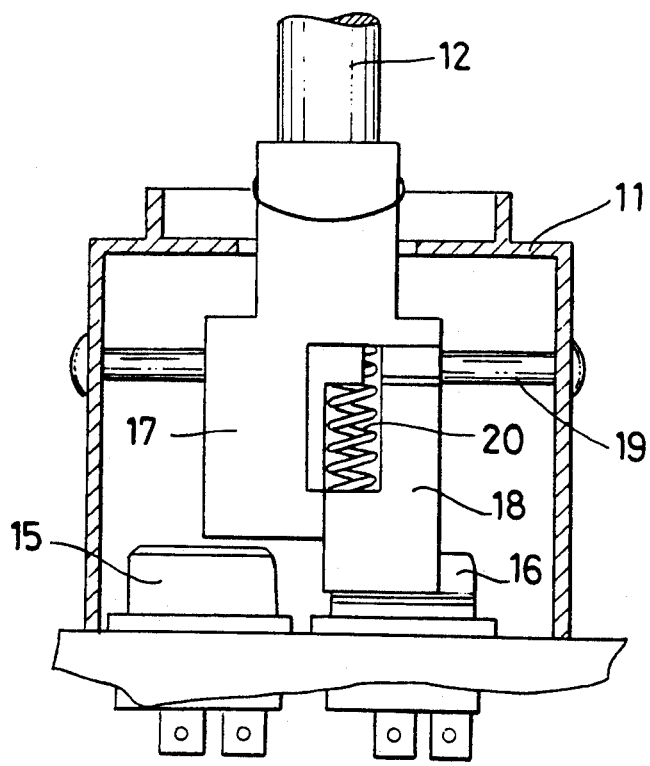
FIG. 3 shows a cross-sectional view of the gearshift of FIG. 2.

As can also be clearly seen in FIG. 2, the lower part of the portion 17 comprises slating surfaces 23 and the portion 18 comprises slanting surfaces 24 for respectively operating switches 15 and 16 of the rocker type normally operated by hand. In particular, the switch 16 is of the type with two fixed positions, while the switch 15 is of the pushbutton or momentary type, that is to say, with only one fixed position (the one shown in FIG. 2).

The upper part of the element 17 has a curved sliding surface 25 which frictionally slides on the edge of the aperture 30 and through which the lever 12 passes through the casing 11. When used, the lever can be shifted to and from the extreme positions shown in FIGS. 4 and 5.

Figure 4:
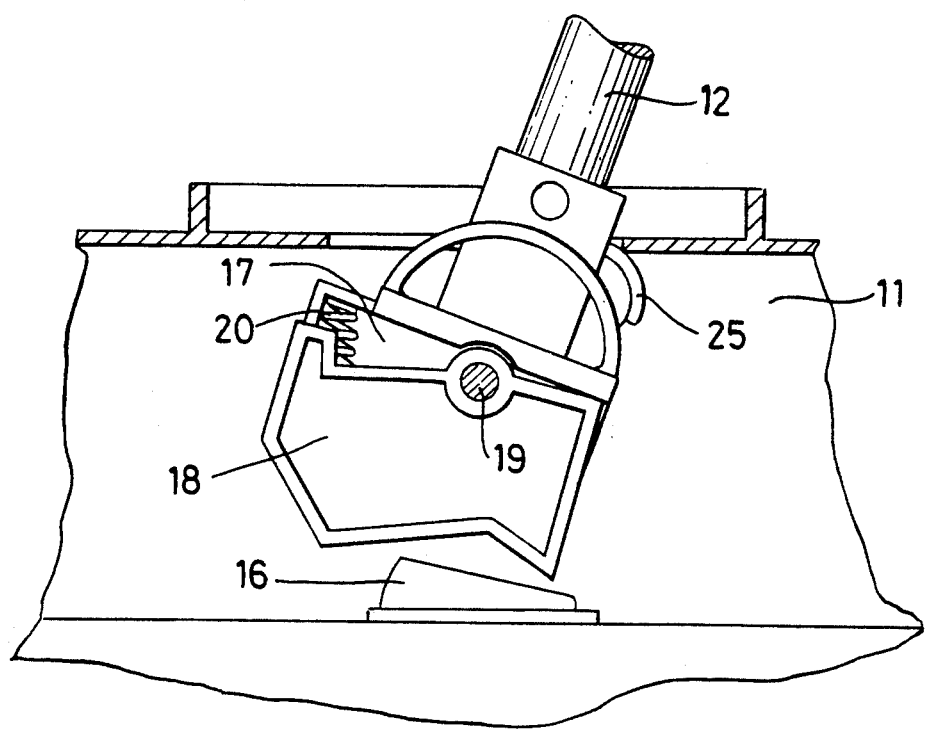
FIG. 4 shows a side view of the gearshift of FIG. 2 shifted to a different gear.

The forward or first position (or turned in a clockwise direction as shown in FIG. 4) is stably balanced thanks to the engagement of the surface 25 with the edge of the casing 11. During the movement to reach the forward or first position the element 18 is pushed by contact with element 17 so that the slanting surface 24 operate the switch 16 to shift it to its other position. The surfaces 23 on the contrary do not come into contact or interfere with the switch 15 during the movement to the forward or first positions as shown in FIG. 4.

When shifting from the forward or first position, in the opposite direction to the second or central position of lever 12 as shown in FIG. 2, the slanting surface 24 return the switch 16 to its original or second position (FIG. 2). For this purpose the force of the spring 20 must be grater than the force necessary to switch the switch.

Figure 5:
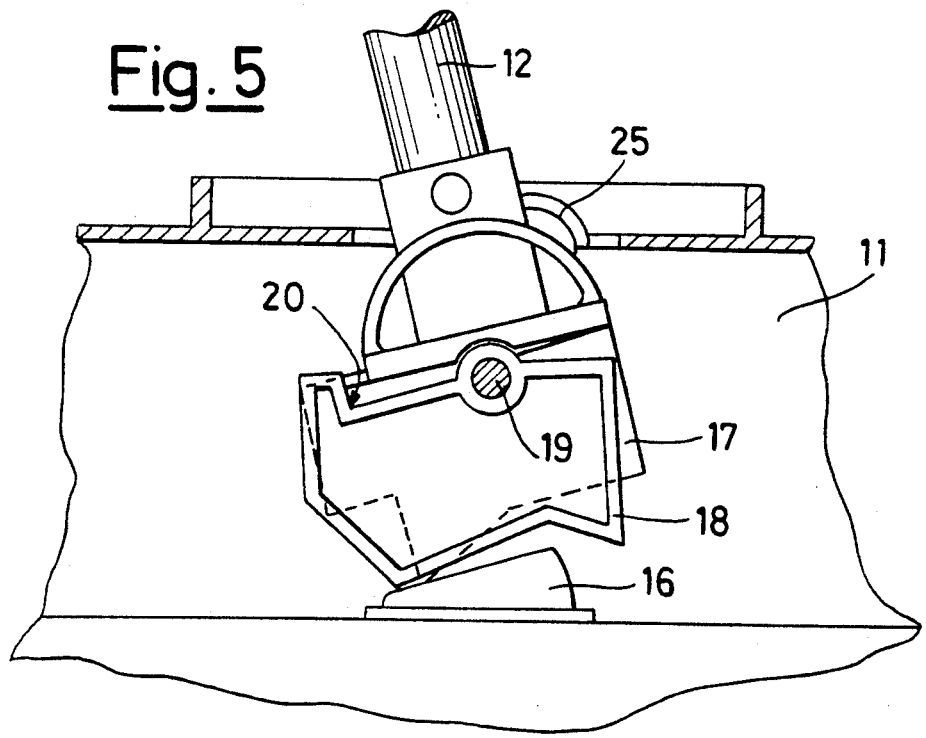
FIG. 5 shows a side view of the gearshift of FIG. 2 shifted to reverse.

When the lever is shifted towards the reverse or third position (or in an anticlockwise direction as shown in FIG. 5) the spring 20 compresses due to the impossibility of the element 18 to rotate further since it strikes against the switch 16. Therefore, switch 16 remains in its original or second position during movement of lever 12 in the third position as shown in FIGS. 2 and 5. The lower surfaces 23 of the lent 17 simultaneously press the switch 15 as shown in FIG. 5. This third position is not stably balanced. When the lever 12 is released, the thrust of the spring 20 returns the device to the central or second position shown in FIG. 2 and the switch 15 snaps back to its only stably balanced position.

Figure 6:
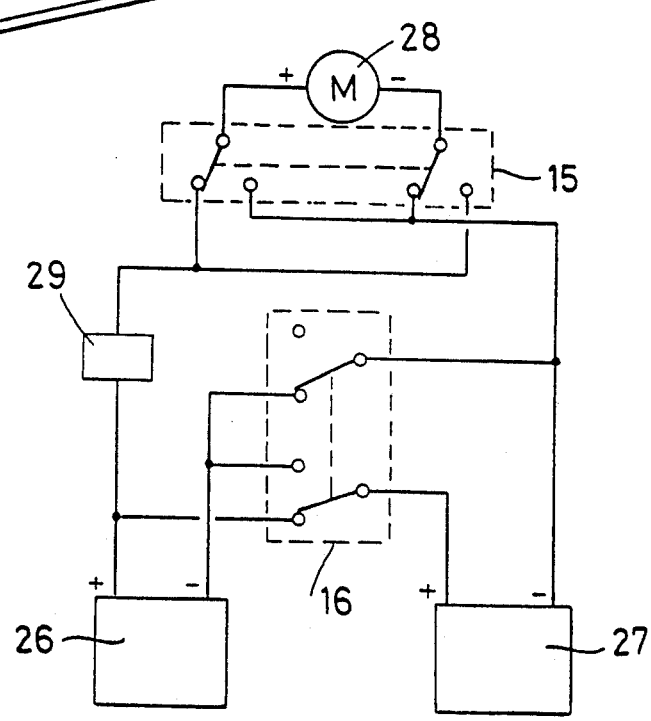
FIG. 6 shows an example of a basic wiring diagram for use of the gearshift described herein.

FIG. 6 shows a possible exemplificative electrical connection of the gearshift of this invention. The switches 15 and 16 used in the example are of the type with two switching contacts, and are connected, as shown, to interconnect two electric batteries 26 and 27 to an electric motor 28 to drive the car. The circuit also comprises a device 29 for controlling the speed of rotation of the motor. This device 29 can be of any known type, for example electronic, as is well known by the technician, and can be controlled, for example, by a pedal disposed in a position similar to that of the accelerator pedal of a normal car.

As can be seen in the wiring diagram (where the switches are in the positions corresponding to FIG. 2), the two batteries (for example 6V) are connected, by means of the switch 16, in parallel with each other. In this way, when the gearshift lever is in the central position, the motor is supplied with a voltage equal to that of a single battery but has at its disposal higher input current. Consequently, the central position can be considered as the low speed gear, for example, for starting.

When the lever is in the forward position, the switch 16 connects the two batteries in series, so that the drive motor is supplied with a voltage twice that of the previous case, even though with a low available current. Consequently, the forward position of the lever 12 can be considered as the high speed gear.

When the lever is in the backward position, the switch 16 connects the batteries in parallel while the switch 15 inverts the connections of the motor so as to obtain the low speed reverse function.

The aforementioned scopes are thus achieved by providing an electric gearshift with a "first gear", "second gear" and "reverse gear", which is inexpensive and simple to manufacture, since it can advantageously make use of normal hand-operated switches available on the market at low cost.

The foregoing description of an embodiment applying the innovatory principles of this invention is obviously given merely by way of example in order to illustrate such innovatory principles and should not therefore be understood as a limitation to the sphere of the invention claimed herein.

For example, the gear lever and the casing containing the device can be shaped differently also in order to adapt to particular aesthetical and assembling requirements in various models of electric motor cars.

I claim:

1. An electric gearshift device for an electric car for children, of the type which can be operated manually to provide different electrical connections between an electric motor and sets of batteries, corresponding to different running condition, the gearshift device comprising: a first two-speed electric selector switch, a second electric reversing switch and a lever movable from a first to a second position to control movement of the firsts switch between a first switch first switching position corresponding to the lever first position and a first switch second switching position corresponding to the lever second position, the lever in the lever second position acting on the first switch with an elastically yieldable thrust surfaces to enable the lever to pass the lever second position in which it controls the first switch and reach a lever third position in which it actuates the second switch.

2. An electrical gearshift device as claimed in claim 1, wherein: the lever acts on the two switches by means of an actuating element having a first portion and a second portion, the first portion having first portion surfaces is set on a pivot and rigidly connected, to rotate on the pivot, to one end of the lever so as to operate the second switch with said first portion surfaces, on reaching said third position; the second portion is set on a pivot, rotatably disposed with respect to the first portion, the second portion having thrust surface, and reciprocal interference means, disposed between said first and second portion, for rotation of the first and second portion integral with the movement of the lever between the second and first position, and said second portion having elastic means for elastic interconnection between said first and second portion during the movement integral with the lever of the first portion only, on rotation of the lever between the second and third position.

3. An electrical gearshift device as claimed in claim 2, wherein: the first switch operated by the first portion has a switching position with a spring-operated return which is operated when the lever is shifted to the third position.

4. An electrical gearshift device as claimed in claim 2, wherein the pivot support of the first portion and the pivot support of the second portion coincide with a single pivot.

5. An electrical gearshift device as claimed in claim 2, wherein: the reciprocal interfering means has a corner on the second portion which strikes against a protrusion on the first portion when the lever is shifted between the second and first position.

6. An electrical gearshift device as claimed in claim 2, wherein: the elastic means has a thrust spring disposed between the first and second portions.

7. An electrical gearshift device as claimed in claim 2, wherein: the first portion has a sliding surface which frictionally slides on the edge of an aperture of a casing through which the lever passes through the casing to constitute a removable engagement on reaching the first position.

8. An electrical gearshift device as claimed in claim 1, wherein: the first switch is connected between a motor and sets of batteries to invert a connection when operated by shifting the lever to the third position, in order to obtain a reverse gear.

9. An electrical gearshift device as claimed in claim 1, wherein: the second switch is connected between a motor and two sets of batteries to connect the two sets of batteries in parallel when the lever is in the second position and to connect the two sets of batteries in series when the lever is shifted to the first position, in order to obtain two speeds.

10. An electric gearshift comprising:
casing;
a lever having pivot means for pivotably connecting said lever to said casing, said pivot means pivoting said lever between a first, second and third position;
a first switch mounted on said casing;
a second switch mounted on said casing;
actuating means for actuating said first and second switches in response to said first, second and third positions of said lever, said actuating means holding said first and second switch in a first connection position when said lever is in said first position, said actuating means holding said first switch in a second connection position and keeping said second switch in said first connection position when said lever is in said second position, and said actuating means holding said first switch in said second connection position and holding said second switch in a second connection position when said lever is in said third position.

11. An electric gearshift in accordance with claim 10, wherein:
said actuating means has first and second control surfaces, said first control surface moving said first switch and said second control surface moving said second switch, said first control surface having elastic means for yielding against said first switch when said lever is pivoted in said third position.

12. An electric gearshift in accordance with claim 11, wherein:
said second control surface is on a fixed portion and said fixed portion is rigidly connected to said lever;

said first control surface is on a yield portion and said yield portion is connected to said fixed portion by said elastic means.

13. An electric gearshift in accordance with claim 12, wherein:
said elastic means has rotation means for rotatably connecting said yield portion to said fixed portion, said elastic means having biased means for biasing said yield portion against said fixed portion in a biased direction of rotation, and said yield portion yielding to said first switch in a direction substantially opposite to said biased direction when said lever is pivoted in said third position.

14. An electric gearshift in accordance with claim 13, wherein:
said second control surface only contacts said second switch when said lever moves between said second and third positions.

15. An electric gearshift in accordance with claim 13, wherein:
said second switch is a momentary switch and has return means to bias said second switch into said first connection position, said return means and said elastic means biasing said lever from said third position toward said second position.

16. An electric gearshift in accordance with claim 13, wherein:
said second control surface only applies force to move said second switch from said first connection position to said second connection position.

17. An electric gearshift in accordance with claim 10, wherein:
said pivot means only pivots said lever about a generally single axis.

18. An electric gearshift in accordance with claim 10, wherein:
said first and second switches are rocker-type switches.

19. An electric gearshift device in accordance with claim 18, wherein:
said rocker-type switches were originally designed to be operated by hand.

* * * * *